No. 792,809. PATENTED JUNE 20, 1905.
G. BAURMANN.
ELLIPTIC SPRING.
APPLICATION FILED APR. 18, 1904.
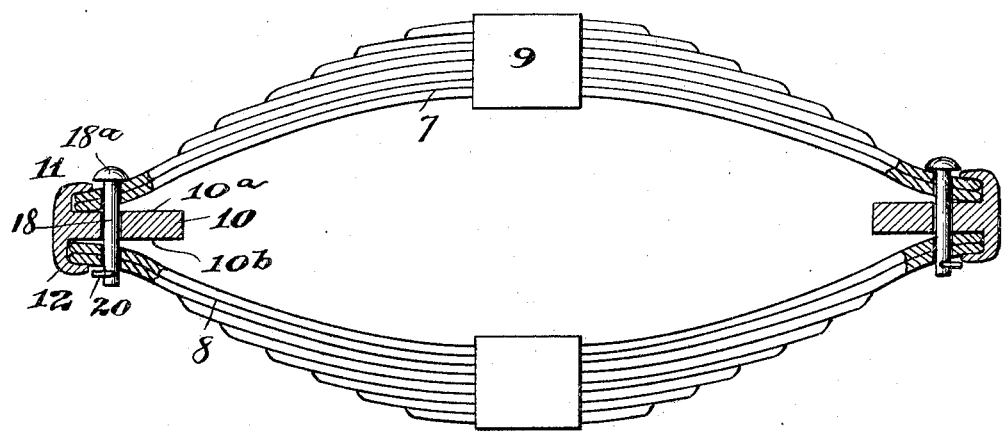
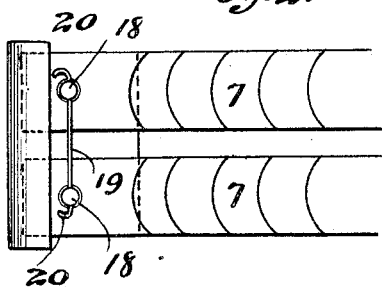
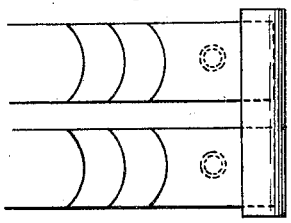
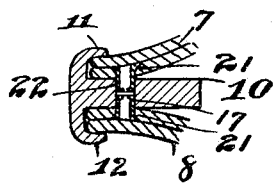
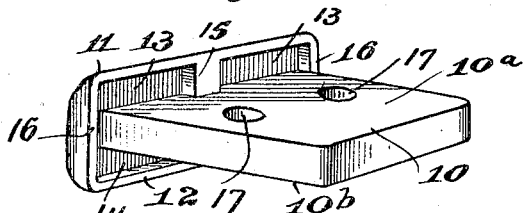
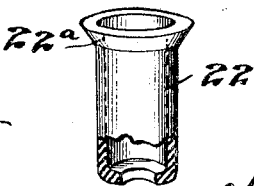
Witnesses,
F. S. Mann,
S. N. Pond.
Inventor,
Gustav Baurmann
By Offield, Towle & Linthicum
Attys.

No. 792,809.

Patented June 20, 1905.

UNITED STATES PATENT OFFICE.

GUSTAV BAURMANN, OF CHICAGO, ILLINOIS.

ELLIPTIC SPRING.

SPECIFICATION forming part of Letters Patent No. 792,809, dated June 20, 1905.

Application filed April 18, 1904. Serial No. 203,740.

*To all whom it may concern:*

Be it known that I, GUSTAV BAURMANN, a citizen of the United States, residing at Chicago, in the county of Cook and State of Illinois, have invented certain new and useful Improvements in Elliptic Springs, of which the following is a specification.

My invention relates to elliptic springs, being designed, primarily, for use in connection with that class of heavy elliptic springs which are employed in railway-cars, although applicable to lighter springs employed in wagons and carriages.

My invention relates principally to a novel form and construction of end plate or connection serving to unite the adjacent ends of the semi-elliptic halves of the spring. These ends have heretofore frequently been united by curling or nesting the ends of the inner leaf of one section around or within the correspondingly-curved ends of the inner leaf of the other section, with a bolt passed between them. This construction is very liable to breakage, owing to weak points at the neck of the curled ends, which are subjected to heavy strain. To avoid this weakness, end plates or connections designed to afford a considerable bearing to the ends of the halves of the spring have been proposed, with means for preventing relative displacement of the spring-halves and connecting-plate in service.

My invention relates to an end plate or connection of this general character, but has for its principal object to provide an improved construction by which the entire spring can be quickly and readily assembled in such a manner that it can be shipped as a single piece without danger of loss of the constituent parts or the necessity of their being reassembled when the spring is ready for use.

To this end my invention consists in an elliptic spring provided with the new and improved end bearing-plate or connection for the two halves of the spring, substantially as hereinafter described, and more particularly pointed out in the claims.

A spring of the character referred to having my invention in its preferred form embodied therein is illustrated in the accompanying drawings, wherein—

Figure 1 is a side elevational view of the assembled spring with the end portions thereof shown in section. Fig. 2 is a bottom plan view of one end portion of the same. Fig. 3 is a sectional detail view illustrating a modified form of fastening. Fig. 4 is a view similar to Fig. 2 when employing the fastening shown in Fig. 3. Fig. 5 is a detail perspective view of the bearing-plate or connection detached; and Fig. 6 is a detail perspective view, partly in section, of one of the hollow fastening-pins employed in the construction illustrated by Fig. 3.

Referring to the drawings, 7 and 8 designate the companion halves of the elliptic spring, made in the usual manner of a series of bent and tempered spring-leaves united by the fastening-clip 9.

10 designates as an entirety my improved end bearing-plate or connection for uniting the ends of the spring-sections. This member consists of a plain rectangular plate which has formed across its outer edge and extending both above and below the same flanges 11 and 12, which flanges are hollowed out on their inner faces to form pockets 13 and 14, adapted to receive the extremities of the inner leaf section or sections of the companion halves of the spring. The form of spring herein illustrated is a double elliptic spring, and consequently the bearing-plates 10 are each provided with a pair of upper and under pockets 13 and 14, disposed side by side, the laterally-adjacent pockets being separated by a vertical partition 15 and having end walls 16 formed as integral parts of the hollowed flanges 11 and 12. Of course the bearing-plate may have a greater number of upper and under pockets 13 and 14 to accommodate triple or quadruple springs when desired or necessary, according to the character of the spring in each case. The rectangular plate has flat upper and lower surfaces $10^a$ and $10^b$, which are provided with a pair of vertical apertures 17, disposed inwardly of each pair of laterally-adjacent pockets, respectively. In assembling the parts the bearing-plates last described are inserted between the adjacent ends of the two spring-sections, with the ends of one or more of the inner leaves entering the sockets 13 and 14. In the particular spring herein shown the inner and next to the inner leaf of each section are shown of equal length, with the ends of both of them fitting into the sockets of the connection-plates. The ends of these leaves are formed with vertical apertures, which when the parts are assembled register with the holes 17, so as to receive fastening-pins 18, which are preferably inserted therethrough from above with their headed ends $18^a$ lying on the upper side of the spring, while the lower ends of the pins are transversely apertured to receive a fastening-rod 19, Fig. 2, the ends of which may be bent or curled, as shown at 20, to prevent displacement. This construction affords a considerable bearing-surface on the connection-plate, on which the ends of the spring-sections may rock, while the loose fit of the tie-pins 18 does not hinder such rocking. The pockets of the connection-plates engaging the extremities of the inner leaf-sections confine the latter against relative displacement in all directions, while not interfering with the limited rocking action of the spring.

When the parts are assembled as described, the spring can be shipped and transported in a single piece, all ready for use and without danger of accidental loss of individual parts or elements thereof, which frequently happens where the spring is shipped in separate parts and subsequently assembled.

Figs. 3, 4, and 6 illustrate a slight modification in the connections between the ends of the spring-sections and the bearing-plate, which may be employed as a substitute for the pins 18. In this construction, as illustrated particularly in Fig. 3, the inner leaf-sections are provided with countersunk apertures 21, which receive short hollow pins 22, Fig. 6, having beveled heads $22^a$ snugly fitting the countersunk portion of the apertures, each of the pins being long enough to extend approximately half-way through the apertures 17 of the bearing-plate. These pins are locked against displacement by the over and under lying ends of the next leaf-section of the spring, both of said sections entering the pockets of the connection-plate, as in the construction shown in Fig. 1. Of course the pins 22 may be made solid, if desired; but hollow pins are lighter and of equal strength, and therefore preferred.

I claim—

1. The combination with the upper and lower halves of an elliptic spring, of a connection-plate between the adjacent ends of said halves, said plate having upper and lower bearing-surfaces for the ends of the spring-sections and horizontally-extending pockets adapted to receive and confine the extremities of said spring-sections, and vertical pins connecting said bearing-plate and spring-sections, substantially as described.

2. The combination with the upper and lower halves of an elliptic spring, of an apertured connection-plate between the adjacent ends of said halves, said plate having upper and lower bearing-surfaces for the ends of the spring-sections and horizontally-extending pockets on its outer edge adapted to receive and confine the extremities of said spring-sections, and pins secured to said extremities of the spring-sections and projecting inwardly into the apertures of said connection-plate, substantially as described.

GUSTAV BAURMANN.

Witnesses:
SAMUEL N. POND,
FREDERICK C. GOODWIN.